United States Patent [19]

Häfner

[11] Patent Number: 5,060,525
[45] Date of Patent: Oct. 29, 1991

[54] RESILIENT CONNECTING DEVICE, IN PARTICULAR WITH INCORPORATED FORCE-MEASURING DEVICE AND PROCESS FOR MANUFACTURING IT

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 425,214

[22] PCT Filed: Feb. 2, 1989

[86] PCT No.: PCT/EP89/00096

§ 371 Date: Sep. 29, 1989

§ 102(e) Date: Sep. 29, 1989

[87] PCT Pub. No.: WO89/07055

PCT Pub. Date: Aug. 10, 1989

[30] Foreign Application Priority Data

Feb. 2, 1988 [DE] Fed. Rep. of Germany ..... 68801249

[51] Int. Cl.⁵ ............................ G01L 5/00; G01L 1/04
[52] U.S. Cl. .......................................... 862.54; 73/756; 73/862.64
[58] Field of Search ........... 73/862.38, 862.49, 862.54, 73/862.58, 862.68, 756, 862.62, DIG. 4

[56] References Cited

U.S. PATENT DOCUMENTS 1,994,388  3/1935  Erichsen ..................... 73/862.62
2,681,565  6/1954  Kelk ........................... 73/862.49
3,410,135  11/1968  Reynaud ..................... 73/862.68
4,770,050  9/1988  Hafner et al. .............. 73/862.68
4,830,399  4/1989  Hafner ........................ 280/707
4,864,874  9/1989  Hafner ........................ 73/862.38

*Primary Examiner*—Charles A. Ruehl
*Attorney, Agent, or Firm*—Armstrong, Nikaido, Marmelstein, Kubovcik & Murray

[57] ABSTRACT

A joint including an elastic connecting device includes a rigid element and a rigid outer element receiving the rigid inner element such that the rigid inner element is movable with respect to the rigid outer element. The rigid inner element and the rigid outer element have respective outer and inner facing surfaces. A bore is disposed in one of the rigid inner element and the rigid outer element, and the bore opens to one of the respective outer and inner facing surfaces. A force/pressure sensing arrangement is disposed in the bore, and a substantially incompressible fluid is sealed in the bore. Elastomeric material is disposed between the rigid outer element and the rigid inner element in force/pressure transmission contact with the force/pressure sensing arrangement. The rigid inner element has a central passage and a radially enlarged portion, and the inner surface of the rigid outer element has a contour generally complementary to the outer surface of the rigid inner element, so as to form an annular intermediate space at least partially occupied by the elastomeric material.

21 Claims, 3 Drawing Sheets 5,060,525

RESILIENT CONNECTING DEVICE, IN PARTICULAR WITH INCORPORATED FORCE-MEASURING DEVICE AND PROCESS FOR MANUFACTURING IT

FIELD OF THE INVENTION

The invention relates to an elastic connection and a force measuring device, as well as a method of manufacturing it.

BACKGROUND OF THE ART

In the International Patent Application WO 87/02129 such elastic connections have been disclosed having at least one force, pressure or torque sensor arranged in an elastomeric material provided between connected parts. Specifically, an arrangement at a spring leg is explained, the force measuring device, however, having a large height of construction and assembly and maintenance work being cumbersome. Furthermore, it is often required to pass ducts or the like through such elastic connections.

Furthermore, U.S. Pat. No. 4,770,050 discloses a measuring device comprising a potlike exterior element in the bottom of which is provided a central opening into which upon curing of the elastomeric material a pressure sensor is inserted and secured by screws. Thus, the pressure sensor is in direct contact with the elastomeric layer.

Though the exchangeable pressure sensor is calibrated and compensated even before insertion it has become apparent that after exchanging the pressure sensor or other transducers the readings of the measurement with equal load sometimes had considerable deviations. The reason for this insufficient reproducibility lies in impurities or inclusions in the contact surface between the elastomeric material and the pressure sensor such that incorporating the sensor requires extreme cleanness. In addition to this disadvantage of insufficient measuring accuracy, in particular when exchanging the pressure sensor in a dusty atmosphere, as f.i. in tool shops the building-in of the pressure sensor is relatively complex since first the pressure sensor must be inserted and then fixed to the supporting element by means of a securing ring and several screws.

SUMMARY OF THE INVENTION

Therefore, it is the object of the invention to provide an elastic connection, specifically a force measuring device, of the above-defined type and a method for manufacturing such an elastic connection, specifically a force measuring device offering a simpler building-in, respectively, exchangeability and measuring readings having a highly accurate reproducibility.

Through a passage in the tube-like inner element lines, shafts and cords may be passed and rigid elements, as f.i. piston plungers of a spring leg may be fixed thereto in an easy accessible manner. For the preferred case of application of a force measuring device in a vehicle, in particular at the spring leg support of an axle it is proposed that the potlike outer element and the pistonlike inner element only have a ringlike mutual contact surface filled with elastomeric material the center of which being provided with a passage for the spring leg piston plunger. Thus, the piston plunger of the spring leg as well as the sensor may be secured in or at the force measuring device, respectively, for completing it from the above in an easily accessible manner.

This easy access is of particular importance not only for the assembly during first production at an assembly line but also for later maintenance and exchange operations in service shops. Furthermore, in view of the central passage in the force measuring cell and the preferable excentric arrangement of the associated sensor in the rest of the ring within the spring leg dome the height of the device and the means for securing the force measuring device are considerably reduced as may be appreciated when comparing with the prior art. An exact guidance and alignment is provided by the narrow cylindrical gap; the formed step provides a large stable supporting surface.

According to the method for manufacturing the force measuring device by inserting or exchanging a laterally provided pressure/force sensor at a force measuring device at first a liquid is filled in into the fill-in opening and subsequently the sensor together with the sensor holder is inserted, in particular screwed in into the fill-in opening. Due to the oil filling the space between the sensor and the elastomeric layer even larger dust particles between the elastomeric material and the sensor will have no effect but will be embedded in the oil. Thus, exchanging the pressure sensor is not restricted to an absolutely clean shop environment. Furthermore, air inclusions or the like will be definitely avoided since the sensor or sensor holder, respectively, is inserted into the opening to an extent that the quantity of filled-in liquid is just sufficient to engage the pressure sensor, or, respectively, the pressure sensor is screwed in until oil is squeezed out at the screw-in location. This ensures a proper transmission of the load acting upon the elastomeric material and the transmission to the sensor without interfering faulty elements, and therefore a highly accurate reproducibility.

By forming an intermediate space between the sensor and the elastomeric material and completely filling, as proposed, this space with an incompressible transmission medium, specifically silicone oil handling of the force measuring device is alleviated in toto. Thus, completing of the force measuring device by inserting of the sensor may be done in service shops without any clean environment and an eventually necessary exchange of the sensors may be accomplished without any requirements as to cleanness. Exchanging of the spring leg or the shock-absorber, respectively, is possible without extra removing the force measuring cell in view of the spring leg support being accessible from the top.

BRIEF DESCRIPTION OF THE DRAWINGS

Further advantageous improvements of the inventions are subject of the subclaims and are explained in detail in the following description of an embodiment. In the drawings

BEST MODE TO CARRY OUT THE INVENTION

Figure 1:
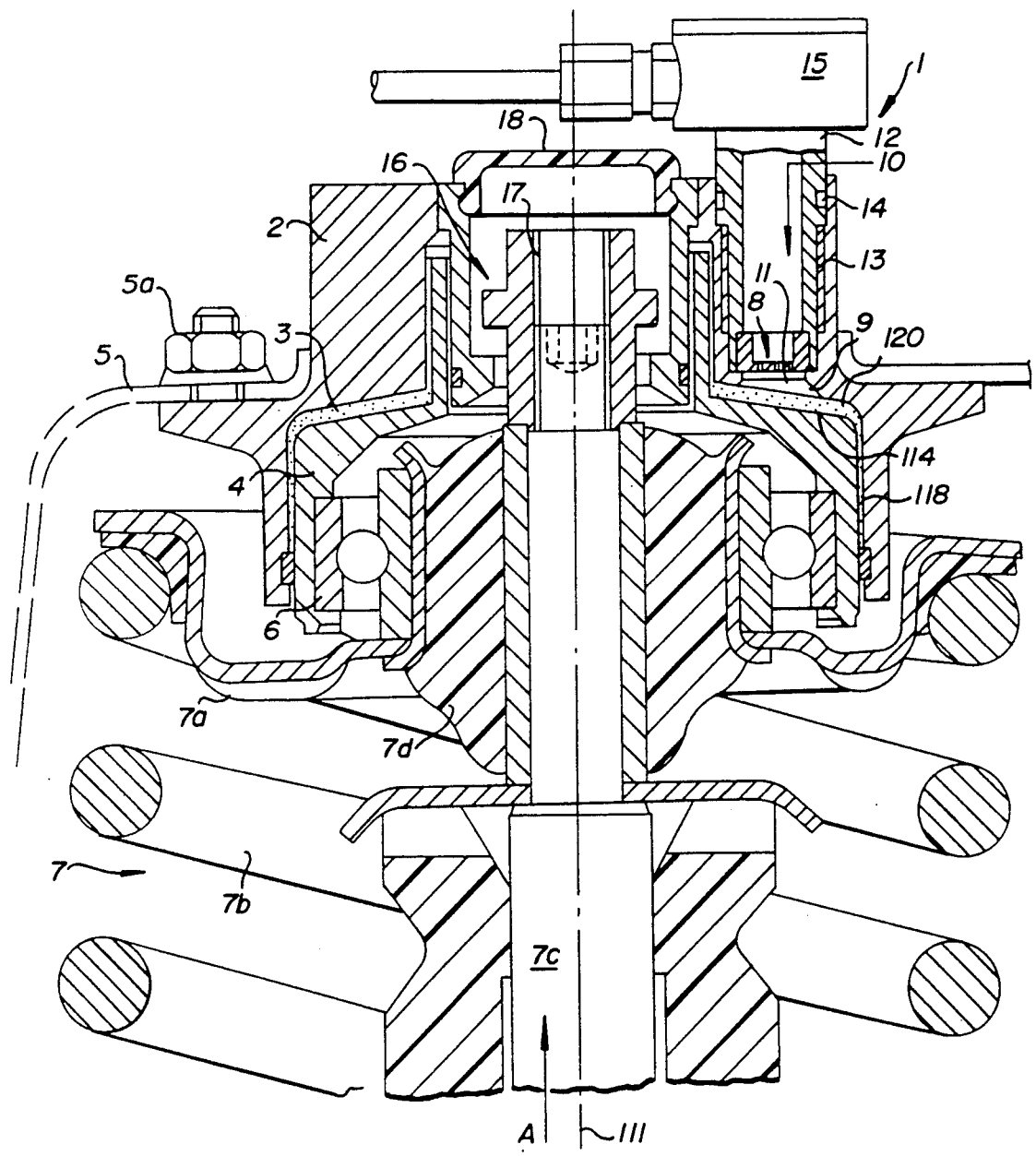
FIG. 1 is a cross sectional view of an elastic connection provided at a spring leg dome of a vehicle having incorporated a force measuring device.

In FIG. 1 an elastic connection, as a force measuring device 1 is incorporated in a spring leg dome 5 of a vehicle by means of screws 5a. The force measuring device 1 comprises essentially a potlike outer element 2 directly connected to the spring leg dome 5. A hollow inner element 4 is arranged within the outer element 2 for movement relative thereto, an angular gap being formed between the two elements 2 and 4 filled with an elastomeric mass 3, in particular silicone. Within the hollow inner element 4, designed according to the invention with a passage 16, there is provided a bearing 6 rotatably supporting the spring leg 7. In the instant case it is the design for a steerable axle, i.e. the front axle of a car. The spring leg 7 comprises in principle, an upper spring washer 7a supporting a spiral spring 7b as well as the shock-absorber the upper part of which is represented by a piston plunger 7c. The piston plunger 7c bears via a bearing sleeve 7d onto the bearing 6 and is secured to the upper end of the spring leg dome 5 by a screw connection 17. The screw connection 17 is accessible within the central passage 16 within the outer element 2 and the inner element 4. For sealing the screw connection 17 and the passage 16 are closed by a cover cap 18.

A sensor 8 is housed in a bore 10 in the outer element 2, specifically in that part of the essentially annular outer element 2 projecting beyond the spring leg dome 5 at the right side of the central axis 111. Through this bore 10 access is given to a rectangular step 114 surrounded by an annular gap 118 and the elastomeric material 3 applied thereto. Upon loading the force measuring device 1, in the instant case by the wheel load in a stationary condition or during movement from the force introduction side A, the elastomeric material 3 is loaded by the inner element 4 specifically at the step 114, thus loading a sensor 8 which is in contact with the elastomeric material 3.

In the instant case the sensor 8 is designed like a diaphragm, and forms in a preferred design an intermediate space 9, toward the elastomeric material 3 the intermediate space being filled in the completed condition of the force measuring device 1 with an incompressible transmission liquid 11, in particular silicone oil. The transmission liquid 11 is filled-in through the bore 10 prior to inserting the sensor 8; however, there may be provided a separate fill-in opening as well. Upon filling-in of the transmission liquid 11 the sensor 8 together with a sensor holder 12 is inserted into the bore 10. For this purpose there is provided a fixing threading 13 into which the sensor holder 12 is screwed-in. A sealing ring 14 protects the sensor holder 12 against exterior influences. For processing the measurements and transmitting the readings captured by the sensor 8 connecting cables extend in the interior of the sensor holder 12 to an amplifier 15 receiving the measuring values, in the instant case the wheel load of the respective front wheel, and processes and passes them through the indicated line, for example to a computer.

Figure 2:
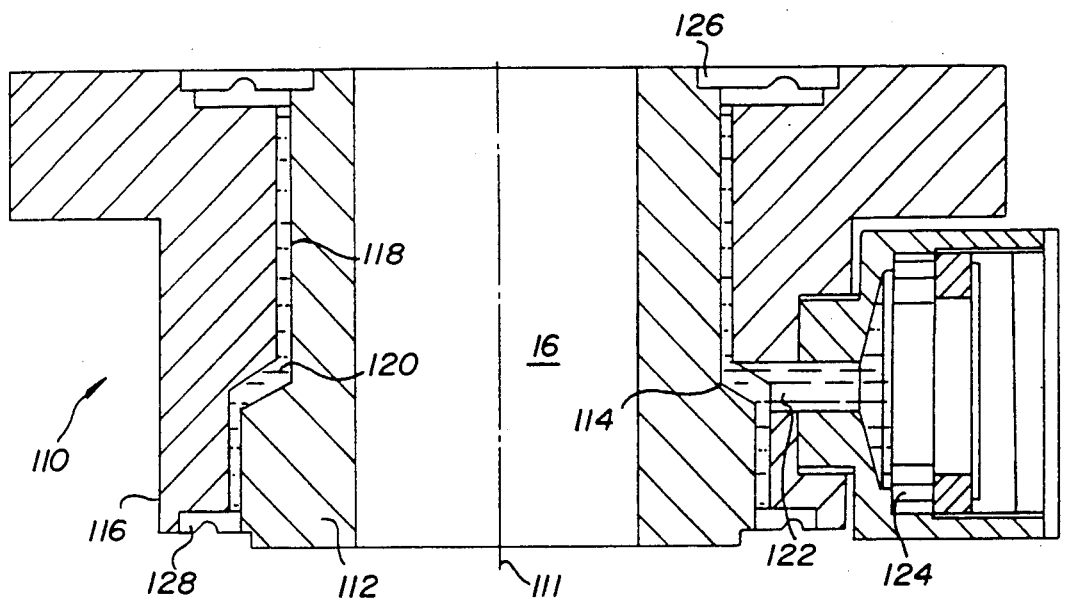
FIG. 2 is an enlarged view according to FIG. 1 showing a modified design.

In FIG. 2 the sensor provided in an elastic connection 110 is designated differently by 124 and is shown in an enlarged view. The sensor 124 has a diaphragm design and operates, for example, by the piezoresistive measuring principle for capturing the pressure values. However, as a sensor 124 exemplary strain gauges or other known transducers may be used. In contrast to FIG. 1 the sensor 124 is inserted in a lateral bore 122 horizontally aligned to the step 114. The step 114 resulting from the extension of diameter of the inner element 112 is tapered and forms an intermediate space 120.

This inner element 112 having the central passage 16 is surrounded by an outer element 116 having a conture complementary to the outer peripheral surface of the inner element 112 leaving a narrow surrounding gap 118 filled with preferably bubblefree elastomeric material (corresponding to the elastomeric material 3 in FIG. 1). In the region of the step 114 of the inner element 112 the surrounding gap is somewhat expanded resulting in a conically annular intermediate space 120 being connected through a bore 122, preferably filled with elastomeric material as well, with the force introduction side of a force or pressure sensor 124 laterally attached to the outer element 116.

The annular gap 118 filled with elastomeric material preferably is closed by an upper and lower ring 126 and 128, respectively, protecting the elastomeric material 120 from exterior influences.

Figure 3:
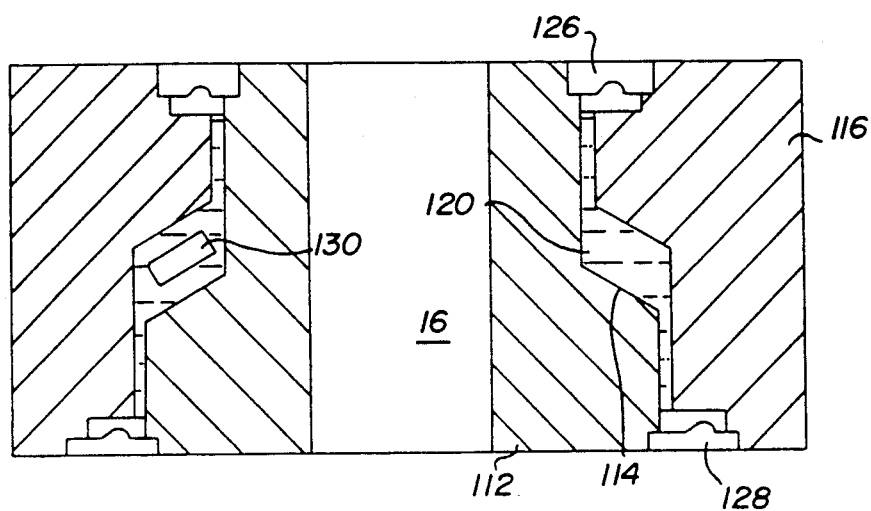
FIG. 3 is a further embodiment of FIG. 2.

FIG. 3 shows an embodiment simplified as compared with that of FIG. 2 having a pressure sensor 130 directly embedded in the elastomeric material provided in the expanded intermediate space 120. In the instant case the intermediate space 120 preferably is arranged centrally between the upper and lower annular space 118 (see FIG. 4) as seen in vertical direction resulting in an exact alignment of the elements connected thereto.

It is the specific advantage of this elastic connection 110 that in the central passage 16 any lines, cords, shafts or axes or the like may extend or any fluids may be passed therethrough. The inner element 4,112 and the outer element 2,116 may be end portions of any other parts; f.i. the inner element 4 in FIG. 4 may constitute a bearing ring of the bearing 6 as well. Alternatively, the outer element 2,116 and the inner element 4,112 may be screwed or otherwise connected each to a different part as a continuation thereof.

Furthermore, the device as shown in FIG. 2 and 3, respectively, represent a force or pressure measuring cell as used in FIG. 1.

With a vertically supported inner element 112 a force exerted on the outer element 116 from the above will be transmitted essentially without friction onto the force or pressure sensor 124 and 130, respectively. Due to the elastomeric material provided in the narrow annular gap 118 any lateral forces will be completely shunted away.

It should be noted that specifically with the embodiment according to FIG. 3 several pressure sensors 130 may be provided peripherally distributed and embedded in the elastomeric material in the intermediate space 120 the pressure sensors being connected through appropriate electrical conductors extending into the interior of the inner element 112 (or even wireless) with an evaluation means.

With a further modification of the shown elastic connection the force or pressure sensor of the embodiment of FIG. 1 may be arranged in the interior of the tube; the bore would extend from the intermediate space 120 through the wall of the inner element 112.

Figure 4:
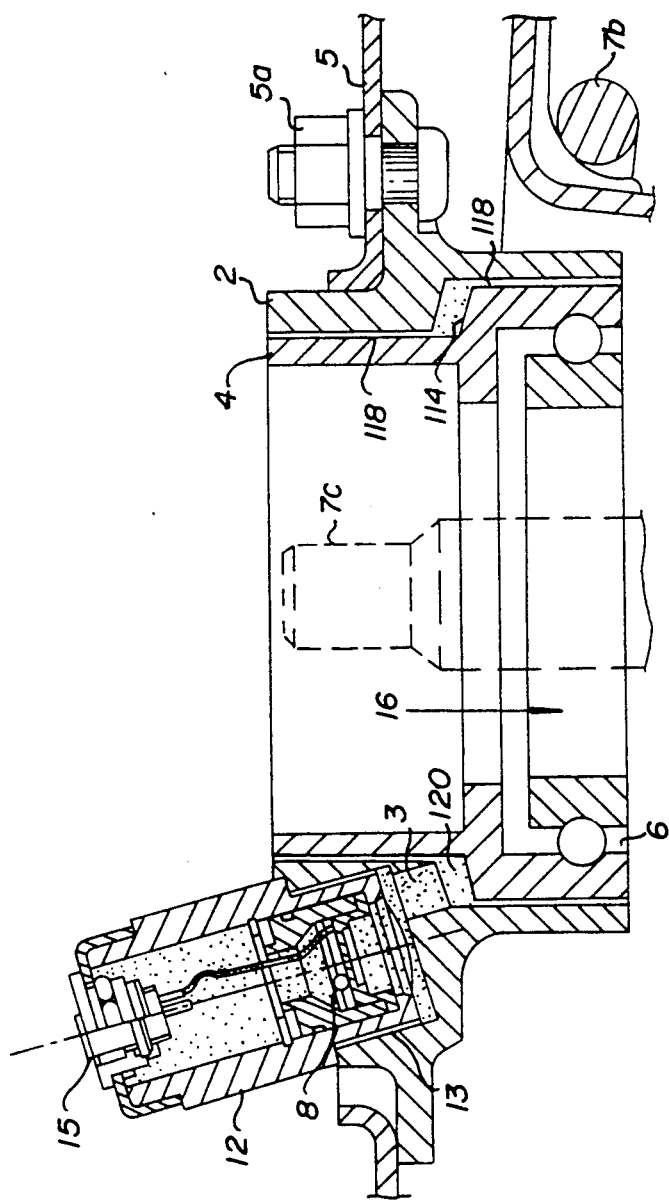
FIG. 4 is a modified embodiment of FIG. 1.

In FIG. 4 the device according FIG. 1 is shown in use having similar reference numerals applied. The inner element 4 is unitary to the outer ring of the bearing 6 for a rotatable mounting of the spring leg 7 represented by the spring coil 7b in a schematic form. In the instant case the bore 10 for connecting to the expanded intermediate space 120 at the step 114 and for receiving the sensor 8 and its sensor holder 12 by means of a threading 13 is aligned perpendicular to the inclination of the step 114. This results in a direct loading of the sensor 8 the inclination thereof further reducing the device height at the spring leg dome 5. Due to the passage 16 the spring leg 7 and its piston plunger 7c as well as the sensor 8 may be easily removed separately for assembly or service work without removing the unit consisting of the inner and outer elements 2,4, which are no wearing parts, by releasing the screws 5a.

Finally it should be noted, that as an elastomeric material preferably rubber, specifically natural rubber may be used. Alternatively, silicone rubber or other elastomeric materials as exemplary mentioned in the WO 87/021929 may be used. It is of importance that the elastomeric material fixedly adheres to the contact surfaces, preferably is vulcanized thereto. As far as a high measuring accuracy is required the elastomeric material should be bubblefree.

Of particular importance for the invention is the unit illustrated in FIG. 4 having the force or pressure measuring device 8 integrated therein. This unit designated as sensor holder 12 has the form of a car spark plug having an outer threading which may be screwed-in into an inner threading of the inserting opening with such a looseness that transmission liquid filled-in prior to the screwing-in may be squeezed out through the threading. In the final position further leaking of transmission liquid may be prevented by a sealing which may be provided either at the end face of the housing or at a stop at the inner end of the threading. The force or pressure measuring device 8 is fixed in the housing; furthermore, the electrical circuits necessary for evaluation, calibration, amplification and compensation may be included in integrated circuits so that the unit may output a strong signal corresponding to the applied force or the present pressure.

I claim:

1. A joint connection, comprising:
   a rigid inner element having outer surfaces;
   a rigid outer element having inner surfaces and receiving said rigid inner element while separating said inner and outer surfaces without contact such that a narrow annular gap exists between the opposing said inner surfaces of said rigid outer element and said outer surfaces of said rigid inner element, said gap being essentially completely filled with elastomeric material strongly adhering to said inner and outer surfaces;
   a force/pressure sensing means disposed in force transmitting communication with said elastomeric material;
   a bore disposed in one of said rigid inner element and said rigid outer element and opening to one of said respective outer and inner facing surfaces, said force/pressure sensing means being in threaded engagement with a wall of said bore; and
   a liquid sealed in said bore such that any space existing between said force/pressure sensing means and said elastomeric material is filled with said liquid.

2. The joint connection of claim 1, wherein said bore is oriented laterally in said outer element.

3. The joint connection of claim 1, wherein said narrow annular gap is sealed at end faces of said rigid inner and outer elements by an annular sealing means.

4. The joint connection of claim 1, wherein said bore extends in parallel to a longitudinal, central axis of said inner element.

5. The joint connection of claim 1, wherein said bore extends in a direction which is normal to a longitudinal, central axis of said inner element.

6. The joint connection of claim 1, wherein said force/pressure sensing means includes a threaded portion which is threadedly engaged with the wall of said bore.

7. The joint connection of claim 6, wherein said force/pressure sensing means comprises a housing, wherein said bore includes a female threading, and one of said housing includes a male threading engageable with said female threading of the wall of said bore so as to have a sufficient clearance therebetween such that any excessive amount of said liquid can escape from said bore upon screwing-in of said force/pressure sensing means, and said force/pressure sensing means further comprising a sealing means for preventing further escape of said substantially incompressible fluid through said threading in a final screwed-in position.

8. The joint connection of claim 1, wherein said joint connection forms a force measuring means provided at a spring leg of a vehicle having a piston plunger secured in a central passage of said inner element, and said sensing means is arranged eccentrically to a central axis and is releasably disposed in said rigid outer element between said piston plunger and a spring leg dome of said spring leg.

9. The joint connection, of claim 1, wherein said threaded engagement fixing said force/pressure sensing means in said bore comprises a connection between inner and outer threadings having a sufficient clearance therebetween that any excessive portion of said liquid can escape from said bore upon screwing-in of said force/pressure sensing means into said bore.

10. The joint connection of claim 1, wherein said force/pressure sensing means is incorporated in a separate interchangeable unit which contains electric circuit means for any of compensation, calibration, evaluation and amplification of electrical signals generated by said force/pressure sensing means.

11. The joint connection of claim 1, wherein said joint connection forms a force measuring means provided at a spring leg of a vehicle, wherein a piston plunger of said spring leg is secured in a central passage of said rigid inner element and said force/pressure sensing means is arranged eccentrically to a central axis and is releasably received in said rigid outer element between said piston plunger and a spring leg dome of said spring leg.

12. The joint connection of claim 11, wherein said inner element is formed as an outer ring of a rotational bearing of a steerable vehicle axle.

13. The joint connection of claim 1, wherein said rigid inner element has a central passage.

14. The joint connection of claim 1, wherein said rigid inner element has a radially enlarged portion.

15. The joint connection elastic device of claim 14, wherein said radially enlarged portion forms a step which is inclined with respect to a central axis of said rigid inner element.

16. A joint having a force measuring device, comprising:
   a rigid inner element having outer surfaces;
   a rigid outer element having inner surfaces and receiving said rigid inner element such that a narrow annular gap exists between opposing inner surfaces of said rigid outer element and outer surfaces of said rigid inner element, said gap being essentially completely filled with elastomeric material strongly adhering to said inner and outer surfaces; said inner and outer elements having adjacent side walls, and said gap being sufficiently thin in the vicinity of at least portions of said side walls such that said elastomeric material contacting said portions of said side walls filling said gap forms a stable joint by permitting only extremely small lateral relative displacements between said side walls of said inner and outer elements;

a force/pressure sensing means disposed in force transmitting contact with said elastomeric material;

said inner element being radially enlarged so as to form a step, and said outer element having a contour complementary to an outer peripheral surface of said inner element in the region of said step, such that an annular intermediate space is formed in a step region between adjacent surfaces of said inner and outer elements at said step of said inner element, said force/pressure sensing means being disposed in force transmitting communication with the elastomeric material in said step region.

17. The joint having a force measuring device of claim 16, wherein said inner element has a longitudinal passage.

18. The joint connection force measuring device of claim 16, wherein said force/pressure sensing means is embedded in said elastomeric material in said annular intermediate space formed at said step.

19. A method for attaching a force/pressure measuring device to a receiving device containing a pressure transmission medium, said receiving device having elastomeric material bordering an intermediate space in the receiving device for contacting said force/pressure measuring device when it is attached to said receiving device, comprising the steps of:

forming an inserting opening in said receiving device into which said force/pressure measuring device may be fitted;

filling-in of pressure liquid into an eventual intermediate space between said pressure transmission medium and said force/pressure measuring device;

inserting said force/pressure measuring device into said inserting opening; and fixing said force/pressure measuring device in said inserting opening, such that said liquid completely fills said intermediate space.

20. The method of claim 19, wherein said force/pressure measuring device is incorporated in a housing being provided with a male threading, and further comprising the step of fitting-in of said housing into said inserting opening by screwing in of said housing into a female threading provided in said inserting opening and having a certain amount of play with respect to said male threading of said housing, and wherein in said step of fitting-in, when completed, providing a sealing engagement between said inserting opening and said force/pressure measuring device.

21. The method of claim 19, wherein a defined volume of pressure liquid is filled into said intermediate space.

* * * * *

UNITED STATES PATENT AND TRADEMARK OFFICE
CERTIFICATE OF CORRECTION

PATENT NO. : 5,060,525
DATED : October 29, 1991
INVENTOR(S) : Hans Wilhelm HAFNER It is certified that error appears in the above-identified patent and that said Letters Patent is hereby corrected as shown below:

On the cover page, Item [30], "68801249" should read -- 8802349--.

Signed and Sealed this

Eighteenth Day of May, 1993

Attest:

MICHAEL K. KIRK

Attesting Officer

Acting Commissioner of Patents and Trademarks